(12) United States Patent
Lundin et al.

(10) Patent No.: US 12,313,541 B2
(45) Date of Patent: May 27, 2025

(54) SYSTEM AND METHOD FOR DETERMINING AT LEAST ONE PROPERTY OF A POROUS MEDIUM

(71) Applicant: GasPorOx AB, Lund (SE)

(72) Inventors: Patrik Lundin, Harlosa (SE); Marta Lewander Xu, Lund (SE); Mikael Sebesta, Dalby (SE); Anders Langberg, Veberod (SE)

(73) Assignee: GasPorOx AB, Lund (SE)

( * ) Notice: Subject to any disclaimer, the term of this patent is extended or adjusted under 35 U.S.C. 154(b) by 146 days.

(21) Appl. No.: 17/997,647

(22) PCT Filed: May 3, 2021

(86) PCT No.: PCT/EP2021/061559
§ 371 (c)(1),
(2) Date: Oct. 31, 2022

(87) PCT Pub. No.: WO2021/219895
PCT Pub. Date: Nov. 4, 2021

(65) Prior Publication Data
US 2023/0221249 A1    Jul. 13, 2023

(30) Foreign Application Priority Data
May 1, 2020    (SE) .................................... 2050502-0

(51) Int. Cl.
*G01N 21/39* (2006.01)
*G01N 15/08* (2006.01)

(52) U.S. Cl.
CPC ............ *G01N 21/39* (2013.01); *G01N 15/08* (2013.01); *G01N 2015/0846* (2013.01)

(58) Field of Classification Search
CPC . G01N 21/39; G01N 15/08; G01N 2015/0846
See application file for complete search history.

(56) References Cited

U.S. PATENT DOCUMENTS

2005/0148092 A1 * 7/2005 Svanberg ................. G01N 7/04
                                                            436/171
2010/0249664 A1 * 9/2010 Burns ................... G01N 21/552
                                                            600/587
(Continued)

OTHER PUBLICATIONS

Search Report and Written Opinion received in International Application No. PCT/EP2021/061559, dated Aug. 6, 2021, in 12 pages.
(Continued)

*Primary Examiner* — Hugh Maupin
(74) *Attorney, Agent, or Firm* — Knobbe, Martens, Olson & Bear, LLP

(57) ABSTRACT

The disclosure relates to system and method for determining at least one property of a porous medium and includes performing a first measurement on a sample of the porous medium obtaining an optical path through pores of the porous medium using a first sensor applied utilizing a first optical technology; performing a second measurement on the sample of the porous medium obtaining a total optical path through the porous medium using a second sensor utilizing a second optical technology different from the first optical technology; and calculating an optical porosity of the porous medium based on the optical path through the pores and the total optical path through the porous medium.

25 Claims, 4 Drawing Sheets

(56) References Cited

U.S. PATENT DOCUMENTS

| | | | |
|---|---|---|---|
| 2012/0140229 A1* | 6/2012 | Svanberg | G01N 29/42 |
| | | | 356/437 |
| 2013/0092846 A1* | 4/2013 | Henning | G01N 21/6408 |
| | | | 250/564 |
| 2018/0024053 A1* | 1/2018 | Humphrey | G01N 21/86 |
| | | | 250/339.05 |
| 2018/0095000 A1* | 4/2018 | Lundin | G01N 21/3504 |
| 2022/0341841 A1* | 10/2022 | Bergstroem | G01N 21/0303 |

OTHER PUBLICATIONS

Office Action received in German App No. 2050502-0, dated Dec. 7, 2020, in 10 pages.

Mei et al., "Pathlength Determination for Gas in Scattering Media Absorption Spectroscopy" Sensors, vol. 14 No. 3, dated Feb. 25, 2014, in 20 pages.

Svensson et al., "VCSEL-based oxygen spectroscopy for structural analysis of pharmaceutical solids" Applied Physics Lasers and Optics, vol. 90 No. 2, Jan. 18, 2008, in 10 pages.

Svensson et al., "Optical porosimetry and investigations of the prorosity experienced by light interacting with porous media" Optical Society of America, vol. 35 No. 11, Apr. 19, 2010.

Mei et al., "Combined optical porosimetry and gas absorption spectroscopy in gas-filled porous media using diode-laser-based frequency domain photon migration" Optics Express, vol. 20, No. 15, Jul. 16, 2012, in 13 pages.

Johansson et al., "" International Jounral of Pharmaceutics, vol. 592 120056, Nov. 5, 2020, in 8 pages.

Cocola et al., "Design and evaluation of an in-line system for gas sensing in flow-packed products" Food Packaging and Shelf Life, Elsevier, vol. 17 pp. 91-98, Jun. 19, 2018.

\* cited by examiner

SYSTEM AND METHOD FOR DETERMINING AT LEAST ONE PROPERTY OF A POROUS MEDIUM

CROSS-REFERENCE TO RELATED APPLICATIONS

This application is the U.S. National Phase under 35 U.S.C. § 371 of International Application No. PCT/EP2021/061559, filed May 3, 2021 entitled "SYSTEMS AND METHODS FOR DETERMINING AT LEAST ONE PROPERTY OF A POROUS MEDIUM", which claims priority to Swedish Patent Application No. 2050502-0, filed on May 1, 2020, entitled "SYSTEMS AND METHODS FOR DETERMINING AT LEAST ONE PROPERTY OF A POROUS MEDIUM".

BACKGROUND OF THE INVENTION

Field of the Invention

This disclosure pertains to determine at least one property of a porous medium using optical technologies, wherein the at least one property may be optical porosity, physical porosity, solid fraction or relative density. In particular, the disclosure relates to a system and method utilizing two different optical technologies, one for measuring an optical path through pores of the porous medium and a second for measuring the total optical path through the porous medium.

Description of the Prior Art

Gas in scattering media absorption spectroscopy (GAS-MAS) (Sjöholm et al., 2001) is a spectroscopy-based technique which has previously been proposed for determining porosity of a porous material. This technique was introduced in 2001 and is based on high resolution diode laser spectroscopy of enclosed oxygen in solid media. GASMAS is based on Tunable diode laser absorption spectroscopy (TDLAS). Here the wavelength of a diode laser is tuned in wavelength across one or several gas absorption lines, to measure the amount of a certain gas species (e.g. oxygen). TDLAS is a well-established, robust technique which is used in many industrial settings (Lackner, 2007). In GASMAS, the measured gas is per definition situated inside cavities or pores of light scattering media, such as the human body, food packages, food products, fruit, wood, etc. (Svanberg, 2019). The key to being able to detect the weak gas absorption imprints in the heavy light absorption spectrum due to the bulk medium, is that the gases create very narrow (picometers or GHz) imprints in the smooth, broadband absorption (many nanometers wide) due to the bulk.

The first pharmaceutical application was demonstrated in Svensson et al., 2007 where microcrystalline cellulose (MCC) based wet granulated tablets were measured and the GASMAS signal demonstrated to correlate with tablet compaction. In spite of technical improvements made, such as Svensson et al., 2008a, 2008b, GASMAS has not been considered to be at a technical readiness level that is required for the industry, for example, the pharmaceutical industry.

A robust optic based technology for fast analysing and determining a property of a porous medium, such as physical porosity, solid fraction or relative density, may be an advantage. In particular an optical technology which could be implemented both at-line and in line.

SUMMARY OF THE DISCLOSURE

Accordingly, embodiments of the present disclosure preferably seek to mitigate, alleviate or eliminate one or more deficiencies, disadvantages or issues in the art, such as the above-identified, singly or in any combination by providing a system or method according to the appended patent claims for determining the at least one property of a porous medium, such as optical porosity, physical porosity, solid fraction or relative density.

The system and method utilizing two different optical technologies, a first for determining an optical path through pores of the porous medium and a second for determining a total optical path through the porous medium. Preferably, in some examples of the disclosure, one of the optical sensors is an implementation of an optical technology using tunable diode laser absorption spectroscopy (TDLAS) technology.

In one aspect of the disclosure, a method of determining at least one property of a porous medium is described. The method may include performing a first measurement on a sample of the porous medium obtaining an optical path through pores of the porous medium using a first sensor applied utilizing a first optical technology. The method may further include performing a second measurement on the sample of the porous medium obtaining a total optical path through the porous medium using a second sensor utilizing a second optical technology different from the first optical technology. The method may also include calculating an optical porosity of the porous medium based on the optical path through the pores and the total optical path through the porous medium.

In some example of the disclosure may the method include obtaining at least one property comprising of physical porosity, solid fraction or relative density of the porous medium based on the optical porosity and a calibration or a theoretic model.

In a further aspect of the disclosure, a system is described. The system may include at least a first optical sensor for measuring an optical path through pores of the porous medium and a second optical sensor for measuring a total optical path through the porous medium. The system may also include a control unit for calculating an optical porosity of the porous medium based on the optical path through the pores and the total optical path through the porous medium.

Some Advantages of the Disclosed System and Methods

The disclosed optical method is non-intrusive/non-invasive and may in some examples be applied in a non-contact way. The method is generally not affecting the sample in any way.

The fast response time of the disclosed optical method or system may also enable implementation of the enclosed systems and methods in inline production situations.

The disclosed optical method allows for spatially resolved measurements so that the at least one property of the porous sample may be provided for multiple positions on the sample, or in multiple volumes of a sample.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which.

DESCRIPTION OF EXAMPLES

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The following disclosure focuses on examples of the present disclosure applicable to determining at least one property of a porous medium using optical technologies. In some examples the porous medium is a pharmaceutical product made from a powder. The disclosure is describing that an optical path length through porous of a porous medium is measured using a first optical technology and the total optical path length through the medium is measured using a second optical technology. The optical path length through the porous and the total optical path length is used for determining an optical porosity of the porous medium. Based on the determined optical porosity, the physical porosity, solid fraction or relative density of the porous medium may be established. The physical porosity, solid fraction or relative density of the porous medium may be established using a calibration or a theoretical model. The optical porosity may be established for a single spot on a sample of the porous medium, on several discrete spots on a sample, or as a distribution over an area of the sample of the porous medium.

The disclosure is suitable to be implanted either in-line or at-line. The disclosure may be used for real-time and automated measurements, and could thus be used to optimize processes. The obtained measurements may be used for direct control feedback. One specific example may be that the disclosure could be used to control the pressure in the roller compaction process for manufacturing medical substances.

Figure 1:
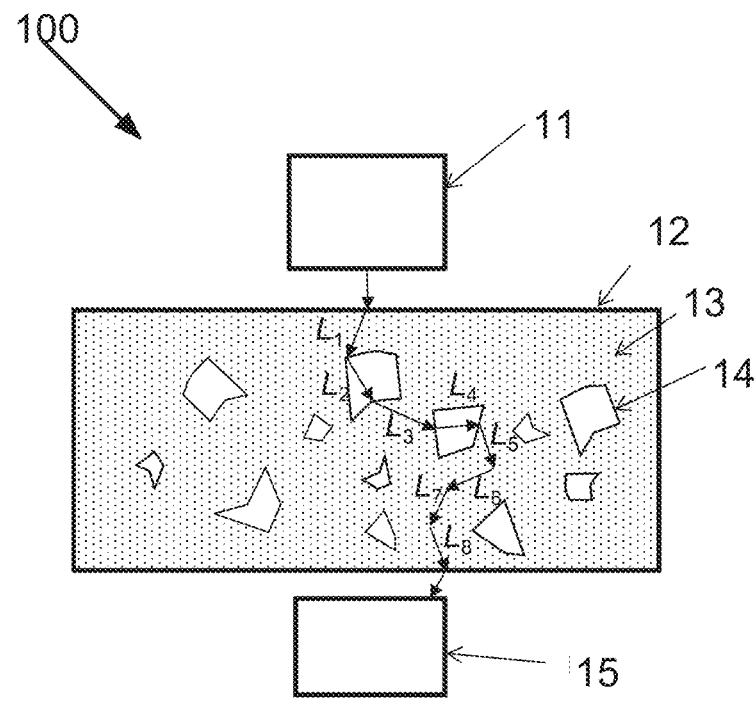
FIG. 1 is illustrating of a schematic example the difference between optical path length through the pores and the total optical path length through the porous medium.

FIG. 1 is illustrating of a schematic example 100 to define an optical path length through the pores and the total optical path length through the porous medium. In FIG. 1, a sensor 10 is illustrated which transmits light from a transmitter 11 through a porous material 12 to a detector 15. The illustration is illustrating a transmission geometry, but depending on the optical technologies used, the measurements may be performed in a reflectance geometry wherein back scattered light from the porous medium 12 is detected. The porous material 12 includes pores or cavities 14, and bulk or solid material 13. The pores and cavities are filled with a gas. $L_{gas}$ is the optical path through injected light has travel through the pores 14 only. $L_{tot}$ is the total path length the injected light has travelled through the porous material, i.e. the gas in the pores/cavities and the bulk/solids. $L_{gas}$ and $L_{tot}$ are defined as follow:

$$L_{gas} = L_2 + L_4$$

$$L_{tot} = L_1 + L_2 + L_3 + L_4 + L_5 + L_6 + L_7 + L_8$$

With this definition, the optical path length $L_{gas}$ is only based on the path length trough the pores 14 and the total optical path length $L_{tot}$ is the path length the light travels both through the pores 14 and the bulk material 13.

To determine the optical porosity, both the optical path length $L_{gas}$ and the total optical path length $L_{tot}$ are determined.

The optical porosity may be defined as the optical path length through the pores of the porous medium divided by the total optical path length through the porous medium. In this context we define the optical path lengths as the physical distances the light travels in the sample, according to the equations above, i.e. not the physical distances divided by the refractive index as may be the case in other literature.

Figure 2:
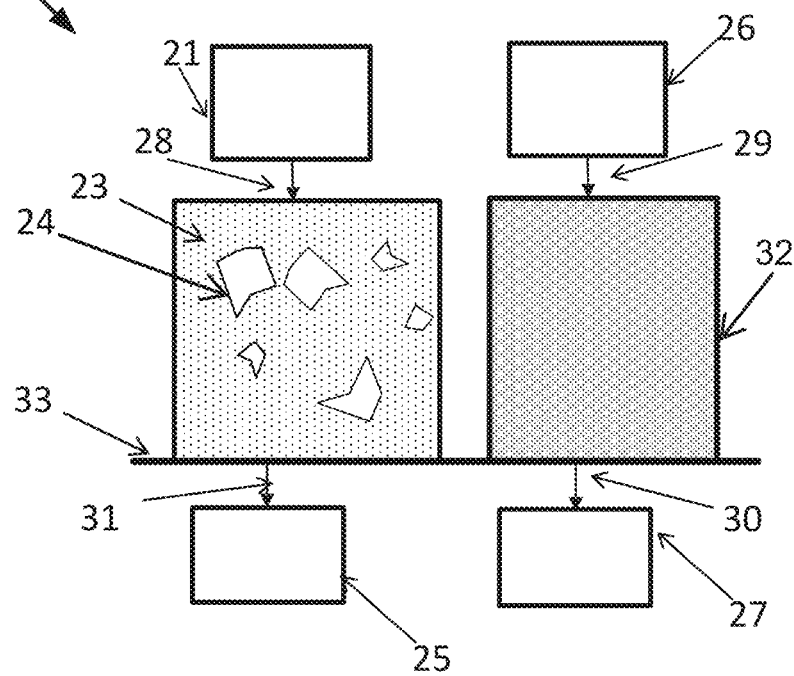
FIG. 2 is illustrating a schematic example of an instrument according to the description.

FIG. 2 is illustrating a schematic example of a system 110 according to the description. The system 110 is configured for providing at least one property of a porous medium 22. The porous medium includes pores and/or cavities 24 as well as bulk and/or solid material 23 in which the pores and/or cavities 24 are dispersed.

The system 110 includes a first optical sensor utilizing a first optical technology for performing a first measurement on a sample 22 of the porous medium to obtain an optical path through pores of the porous medium. The first optical sensor may include a first light source 21 for injecting a first light signal 28 into the sample 22 and a first detector 25 for detecting a first detection signal 31 related to at least a portion of light exciting the sample 22 related to the first light signal 28. The system 110 further includes a second optical sensor utilizing a second optical technology, such as the second optical technology is different from the first optical technology for performing a second measurement on the sample 22 of the porous medium to obtain total optical path length of the porous medium. The second optical sensor may include a second light source 26 for injecting a second light signal 29 into said sample 22 and may include a second detector 27 for detecting a second detection signal 30 related to at least a portion of light exciting the sample 22 related to the second injected light 29.

In some configurations of the system 110, the first optical sensor and the second optical sensor may share a common light source. This may be done by splitting the light between the two sensors or by injecting light at one or multiple positions on the sample 22 and detect light by the same or different detectors 25, 27 at the same time.

Additionally, and/or alternatively, in some examples, the first optical sensor and the second optical sensor may share a common detector. For example, when sharing a common detector, a single detector may collect transmitted light or reflected light from the sample 22 for both optical sensors. The light collected by the single detector may then be used differently for each of the optical technologies depending on the technology used.

The system 110 is illustrated in a transmission geometry. Alternatively, it is possible to conduct at least one or both of the measurements by arranging one or both of the detectors 25, 27 to detect light exiting the sample 22 from a different angle, such as from the side of the sample 22 or in a reflectance geometry detecting back scatter light form the sample 22.

Additionally, and/or alternatively, in some examples, the system 110 is configured to obtain a distribution of optical porosity across the sample 22. This may be conducted by, for example, moving the sample 22 in at least one direction to perform measurements of the first and second measurement at more than one point on the sample 22.

In the described system 110 any of the light sources 21, 26 may be a white light source, for example transmitting a collimated light beam, or at least one laser source, such as a diode laser, a semiconductor laser. Any of the detectors 25, 27 may be for example, a photodiode, a photomultiplier, a CCD detector, a CMOS detector, a Si detector, an InGaAs detector, multiple photodiodes, PMT array, multiple optical fibres connected to separate detectors, Position sensitive detectors (PSD), selected to be able to detect the wavelengths or wavelength range of the light source.

In some examples may optics, such as a lens system, be arranged to collect the light and focus it on the detector.

The two optical sensors may be combined into a single system. By combining the two optical sensors into a single system, the first measurement and the second measurement may be performed sequentially on the sample 22 with high precision. For example, this allows the first measurement and the second measurement to be performed on the same position on the sample 22.

In a configuration of the system, the sample 22 may be automatically moved between the first and second optical sensor whereby the illumination of the sample 22 and detection is performed in the "same optical geometry" for both the first and the second measurement. The "same optical geometry" may here mean, for example, that light is collected from the same area of the sample and/or collecting using the same field-of-view, having detectors with the same angular detecting sensitivity, etc. On the illumination side the wording "same optical geometry" may mean that the first and second optical sensor illuminated the same surface of the sample, which may be done with a light beam with the same divergency, etc. The sample 22 may be moved between the first and second sensor using a movable member 33, such as a step motor or a translation stage.

Another example is not to move the sample 22 but to change the optical sensor between the measurements, for example by moving or shifting the detector and/or the light source.

In examples where the two sensors shares a common light source, such as a diode laser, a driving unit of the light source may be used to control a change in, for example, frequency between the two measurements, such as by changing a ramping and/or modulation of the frequency.

The system 110 may be configured to perform the first and second measurement in an in-line implementation, such as on a conveyor band in a manufacturing or packaging facility, or for example at the outfeed of a roller ribbon compactor. In this implementation, a time delay may be calculated as a function of an in-line speed. By calculating the time delay the first and second measurements may be sequentially performed on the same position on the sample 22.

To avoid errors to the system drifting over time, such as in the light source for example an intensity of at least one of the light sources, or the response time of detectors or electronics, an instrument response function may be obtained for one of the first and second optical sensor by measuring a reference sample 32. The reference sample 32 may be measured while the other of the first and second optical sensor is performing a measurement on the sample 22 of the porous medium. The transmittance or reflectance of the reference sample may be automatically adjusted to be similar to the transmittance or reflectance of the sample 22. This may be done by having more than one reference samples which may be arranged automatically in the beam path of the optical sensor. The reference sample to be used may be automatically selected to be close to the value of the transmittance or reflectance of the sample based on the measurement of a previous similar sample or, based on the value of the measurement being performed. Alternatively, an attenuator may be automatically adjusted to give similar intensity on the detector for the sample and reference measurements.

To further improve the measurements, the instrument 110 may be configured to reduce optical noise by controlling the illumination of the sample. This may be made by dithering a laser beam of the first and/or the second optical sensor, arranging a diffusor before the sample, utilizing a moving diffusor such as a diffuser mounted on rotating or vibrating mechanics, utilizing a laser speckle reducer and/or moving the sample during the measurement.

A control unit (not illustrated) may be configured for calculating an optical porosity of the porous medium based on the optical path through the pores and the total optical path through the porous medium. The control unit may further be configured for obtaining at least one property comprising of physical porosity, solid fraction or relative density of the porous medium based on the optical porosity and a calibration or a theoretic model. As an example the theoretical model to relate optical porosity and physical porosity may for example be the equation given as Eq. 9 in reference Libois et al. 2019.

An example of a calibration is to use reference samples with known properties, such as physical porosity, solid fraction or relative density. The reference samples are measured using the system 110 to obtain a calibration model between the optical porosity of the reference samples and at least one property comprising of physical porosity, solid fraction or relative density. The unknown properties of a sample 22 may then be obtained from the calibration model.

All determinations or calculations described herein may be performed by a control unit or a data processing device (not illustrated).

The control unit or a data processing device may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/ non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc., as well as one or more data acquisition devices, such as an A/D converter. The special-purpose software may be provided to the control unit or data processing device on any suitable computer-readable medium, including a record medium and a read-only memory.

In some examples of the system the first optical technology is Tunable diode laser absorption spectroscopy technology (TDLAS), such as GASMAS. When using TDLAS, a light source is swept over an absorption peak of a free gas inside the cavities and or pores. The gas may be air, oxygen, carbon dioxide (CO2), water vapor. GASMAS is the principle that the spectrally sharp gas absorption can be distinguished from the broadband absorption of liquids and solids. This results in that a small gas absorption signal, (order of 1 in 10 000) can be extracted from light passing through a scattering and absorbing material despite transmitting only a minor fraction of the injected light with the GASMAS method. The GASMAS sensor is tuned over a specific gas absorption line by ramping the drive current. The GASMAS sensor electronics then converts the measured intensity on the detector to a measurement of the absorption by the gas in the sample. By having an estimated known gas concentration of the gas in the sample the absorption can then be converted to a measurement of the travel distance trough the gas. As an example, in many cases the concentration of, for example, oxygen in the sample may be known to be the same or similar as in the surrounding air. In some examples the sample may have pores or cavities that are ventilated to the surrounding (open pores/cavities). In other examples the concentration may be known in other ways, for example by that the concentration was known when the sample was made.

In some other examples the second optical technology may be Photon Time-of-Flight (PTOF). When conducting the Time-of-flight measurements an average time for the photons to be transmitted through the sample 22 is obtained, mean time-of-flight (MTOF). The pTOFS sensor sends a pulsed laser beam with a wavelength close to that of the first optical sensor through the same area of the sample. A photon counting detector is used to measure the individual photon flight time through the sample. From a measurement the average photon time of flight is measured and is then converted to a total optical path length through the sample.

To obtain the total path length the light travels through the sample, an average refractive index of the sample is required. The refractive index may be obtained by an iterative process. The average refractive index of the sample is a weighted average of the (average) refractive index of the solid (or liquid) bulk material(s), and the refractive index of the gas in the pores. The refractive index of the gas in the pores can often be assumed to be equal to 1. To obtain the average refractive index of the total sample an iteration as follows may, as an example, be used:

1. Assume that the average refractive index of the sample $n_{avg}$ is the same as the bulk $n_{bulk}$.
2. Obtain a first guess of $L_{tot}$ by dividing MTOF by the bulk refractive index and multiply by the speed of light in vacuum.
3. Obtain a first guess of the optical porosity by dividing $L_{gas}$ with the first guess of $L_{tot}$.
4. Use the first guess of optical porosity to obtain a better guess of the average refractive index of the sample through the weighted average $n_{avg}$=(1−optical porosity)*$n_{bulk}$+(optical porosity)*$n_{gas}$.
5. Iterate from point 2 until the optical porosity converges into a stable value.

As an alternative, or improvement, the physical porosity may be used instead of the optical porosity in the above iteration process, by conversion through above described theoretical model or calibration.

In one example of the disclosure the instrumental set-up used is based on measuring two path lengths, total path length and the path length through the pores only. The GASMAS technique is through its principle measuring the absorption by gas. To obtain the total path length, the instrument may also be equipped with a time-of-flight (TOF) system. The two measurements (GASMAS and TOF) may be performed sequentially, by automatically moving the sample between the two parts of the instrument. To measure the optical porosity, the sample may be placed on a sample holder plate. When the measurement is started, the sample may be moved (by a translation stage) into position for TOF measurement, which is then conducted for a pre-set time (generally a few seconds). Once the TOF measurement is finished, the sample may be automatically moved into position for GASMAS measurement, which, again is conducted during a pre-set time (generally a few seconds).

Reference measurements of the signals without sample are also automatically performed both for the TOF and GASMAS during the measurement sequence.

The initial outputs from the TOF measurement and GASMAS measurement are the mean time-of-flight through the sample (for example in unit nanoseconds) and the path length through pores (for example in unit millimetres), respectively. By user input of the average refractive index of the bulk material, the instrument calculates the optical porosity. To obtain valid results for the optical porosity it is important that the two techniques (GASMAS and TOF) probe the sample in the same way. In practice this means that the two techniques use the same wavelength (for example 760 nm), illuminate the sample in the same way and detect the same distribution of transmitted light.

Figure 3A:
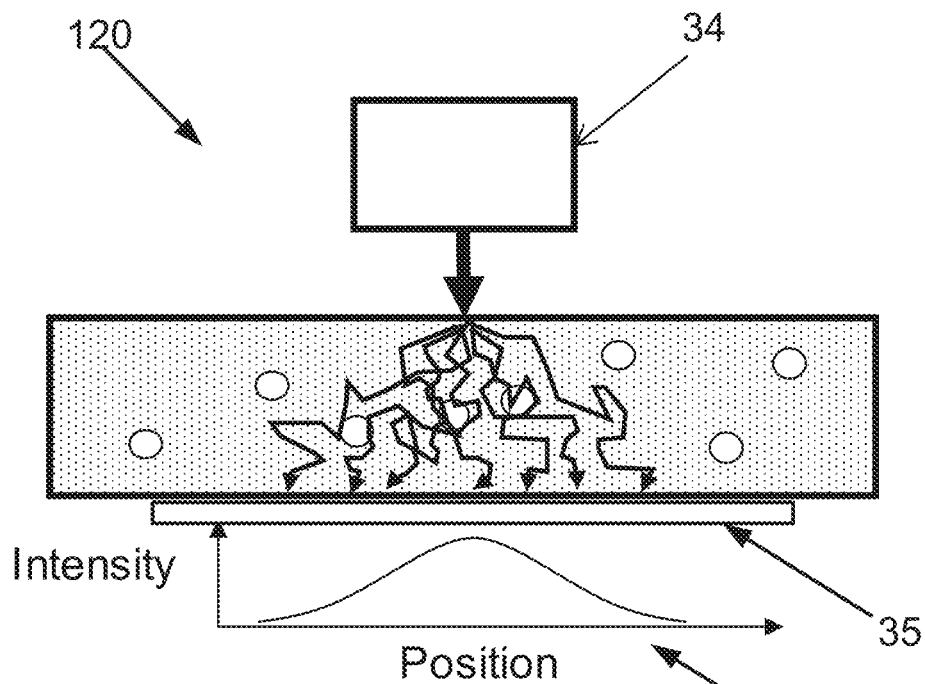
FIGS. 3A and 3B are illustrating schematic examples where an imaging technology is used for determining a total optical path length trough a porous medium.
Figure 3B:
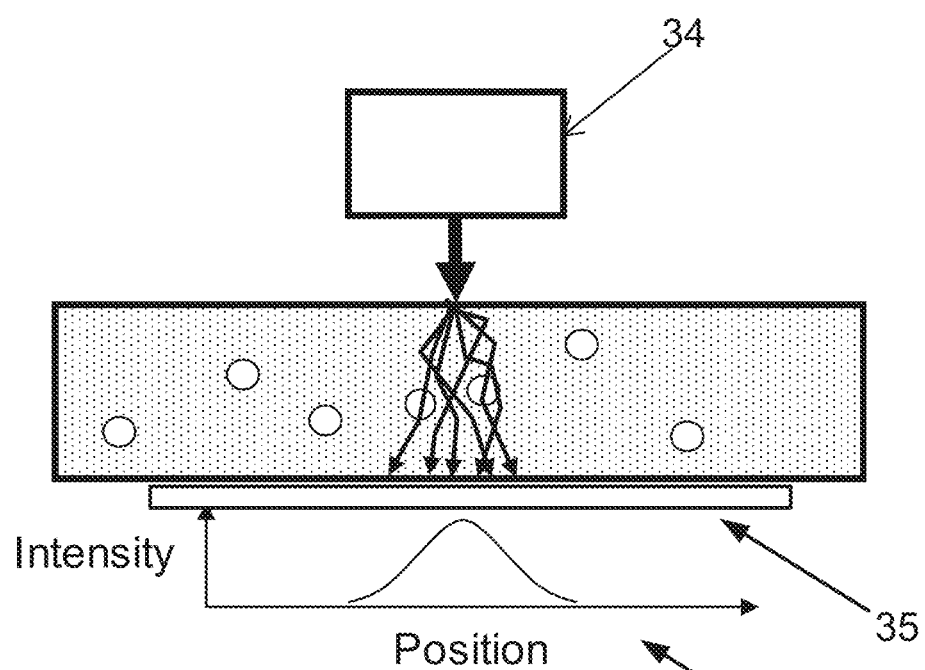

FIGS. 3A and 3B are illustrating examples where an imaging technology is used for determining a total optical path length trough a porous medium. The imaging method may be a spatial resolved technology wherein a light source 34 is illuminating a sample. At least a portion of light exiting the sample, either after the light has been transmitted through the sample or reflected by backscattering is collected. The light may be collected using a detector 35 able to obtain a spatial distribution of the light, or a measure or signal related to the distribution of the light, such as an array for example a CCD array or 2D camera, a PSD etc. The total path length may be obtained from the spatial distribution of the light exciting the sample. The intensity curve 36 will differ due to scattering strength of the material. FIG. 3A is illustrating a sample with more scattering and a longer total path length than the sample in FIG. 3B which may be concluded from the intensity curve 36 in FIG. 3A which is wider than the intensity curve 36 in FIG. 3B. The total path length may be obtained by a calibration model or a theoretical model, for example based on the diffusion theory or Monte Carlo simulations of light transport in scattering media.

The calibration model may be obtain by measuring reference samples with known total path lengths and the collected data may then be used to build a model to which samples with unknown total path length may be compared to obtain the total path length of the sample.

A calibration using samples with known properties, may also be used to give a calibration between total optical path length and light distribution, such as the light distribution utilized in FIGS. 3A and 3B.

In one example the first optical technology for measuring an optical path through pores is based on TDLAS, such as GASMAS and the second optical technology is an imaging method, such as a spatial resolved technology. Such a system may be configured to share a common light source. The light source may illuminate the sample as a location and two detectors may be used to detect the transmitted or reflected light from the sample, one detector as part of a first sensor and the second detected as part of a second sensor. The detectors may be arranged in various constellations, for example, both may be arranged for measuring reflected back scattered light, for example by being arranged at an angle in relation to the illuminated spot. In another example one detector may be arranged for measuring back scattered light and another detector may be arranged for measuring transmitted light, such as opposite the light source or from a side of the sample. In another example is one detector arranged opposite the light source and another is used for detecting light from a side of the sample.

In another example, the first optical technology for measuring an optical path through pores is based on TDLAS, such as GASMAS and the second optical technology is an imaging method, such as a spatial resolved technology. The two sensors may share both a common detector and a common light source. The detector may be arranged to detect either transmitted light or reflected light being back scattered from the sample. The detector may here be an array, such as a single line array or a 2D detector. The spatial distribution of the collected light may be used for calculating the total light path while detected intensity from more than one pixel may be combined to be used from the TDLAS, such as GASMAS, to measure the optical path length through the pores only.

In a further example, the second optical technology may be based on the phase shift based time-of-flight variety, also referred to as frequency domain time-of-flight,—when applied in light scattering materials often referred to as Frequency-Domain Photon Migration (FDPM). In this example the total optical path through the porous medium may be obtained from a phase shift in the received high frequency intensity modulated signal. When the total path length through the sample increases, the phase of the intensity modulation of the detected signal may be shifted.

A drawback of the phase shift method is that the recorded exact phase shift for a given total path length may drift due to system drifts. To improve the accuracy of the second optical technology, reference measurements of the "instrument response function" may be obtained from a reference sample using the second optical sensor shortly before or after the second technology has been performed on the sample.

As a means to reduce the influence of system drifts that may affect the recorded phase shift, an alternative approach may be to not primarily detect the phase shift, but to instead look at other features of the detected signal. For example, the intensity may be modulated with a saw tooth or triangular wave form, or another wave form. When the scattering of the sample increases, which is connected to that the total path length becomes longer, there is a wider distribution of time delays. This means that the features, especially intuitively the sharp features, of the wave form will become "blurred" or "widened". This effect may generally be less affected by system drifts and may thus require no or less frequent calibrations. As a specific example the intensity of the light output of the second technology may be modulated with a triangular wave form. The sharpness of the peaks in the detected intensity wave form may then be calibrated to samples with known total path lengths. The total path lengths of new samples may thereafter be measured through the sharpness of features, such as the peaks, in the detected intensity wave form.

An advantage of the phase shift method compared to pTOFS when combined with GASMAS, is that the light source and detector may more easily be shared for the two methods. As pTOFS generally requires a pulsed laser source and a photon counting detector, the phase shift method may more easily use the same diode laser and photodiode as used for the gas measurement.

As a further example the absorption lines detected and used for the path length measurements through the pores with the first technology, may also be used for measuring the total path length with the second technology. In one variety, the first technology may be based on TDLAS where the wavelength of the diode laser is tuned across one or several absorption lines of the detected gas. If the wavelength tuning is fast enough, e.g. in the MHz regime, the width of the detected absorption lines may increase as the total optical path length is longer. This is due to the fact that as the total optical path length is longer, the spread in total optical path lengths will also increase (true in the diffuse light scattering case). This means that there will be a spread in the time delay between when a certain wavelength is emitted from the laser to when that specific wavelength is detected. As the physical light absorption by the gas may have a fixed distribution of wavelengths (fixed pressure and temperature) the shape of the detected absorption line may depend on the total optical path length. The connection between the withs of the detected absorption line(s) to the total optical path lengths may be obtained through calibration or theory.

Another effect is that the part of the detected light that has experienced the longest total optical path through the sample in general will have a stronger gas absorption imprint, since it will likely have encountered more gas on its way. This means that the light with a certain wavelength that is detected later will have a stronger gas absorption. This "skewness" will also affect the gas absorption line shape, making it non-symmetric and may be used as a means to estimate the total optical path length.

Figure 4:
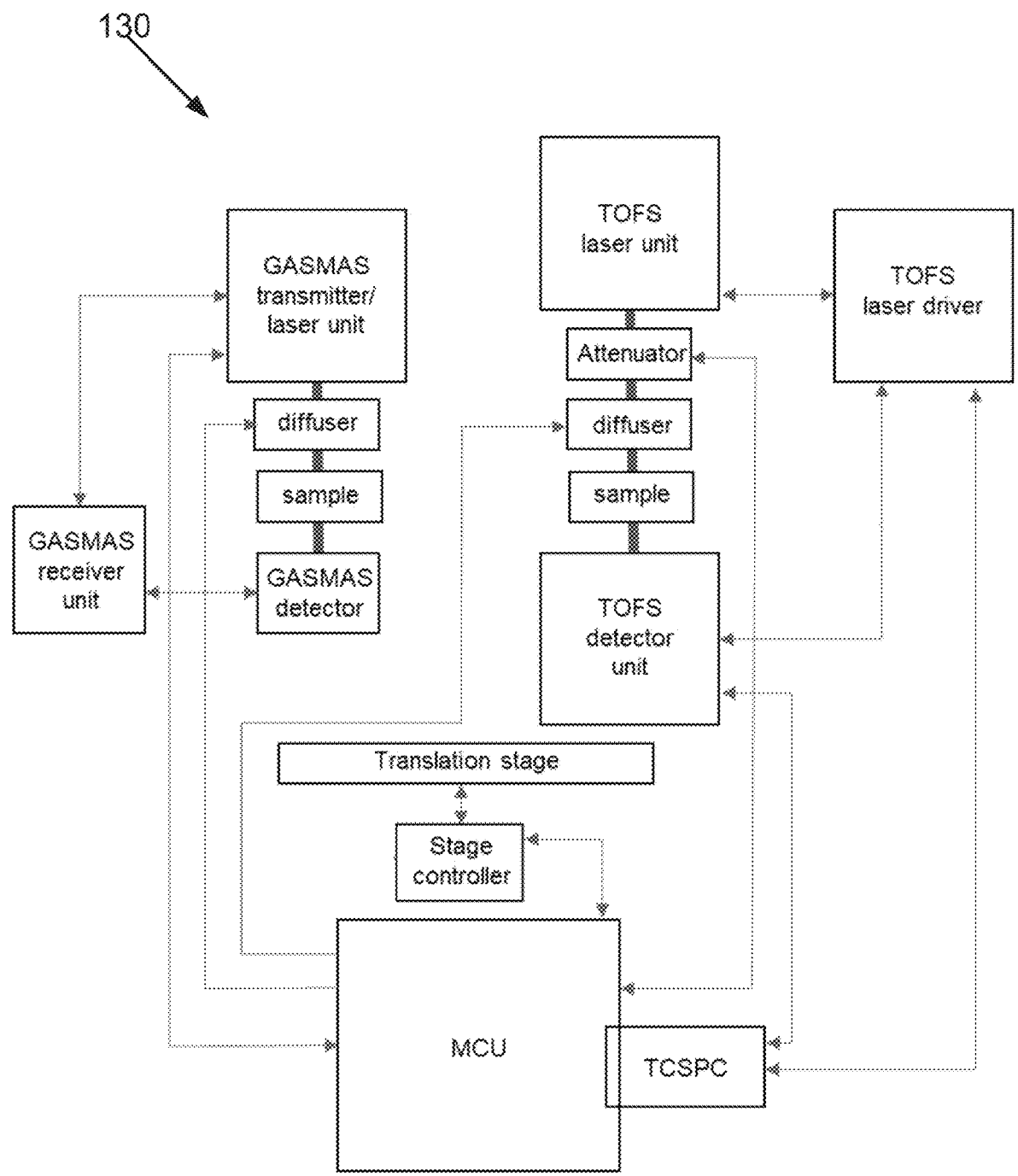
FIG. 4 is illustrating an example of an implementation of a system according to the disclosure.

FIG. 4 is illustrating an example of an implementation of a system according to the disclosure. The system is controlled by a main control unit (MCU). The measurement system is then divided in three main parts. A GASMAS transmitter unit which contains the diode laser, driving electronics, laser collimation, etc. The collimated beam from the transmitter unit may be sent to a moving diffuser with purpose to shape the beam into a desired size and to minimize laser speckles/etalons on and from the sample. After passing through the sample the light is detected by the GASMAS detector, which may be a PIN photodiode. The current from the photodiode is collected with the GASMAS receiver unit, which may amplify the signal and converts it to digital data.

The receiver unit communicates with the transmitter unit, where the main data processing occurs. The transmitter unit may communicating the measurement results, and other essential status information, to the MCU. Through the same communication the MCU may also send settings to the transmitter unit, e.g., measurement time, trigger signals, etc.

A TOFS laser driver may be pulsing a ps-pulsed diode laser at a high repetition rate (such as 80 MHz). The laser driver has an internal clock for the pulsing. The TOFS laser unit may be fiber coupled through a polarization maintaining single mode fiber. A computer controlled variable attenuator may probably be used to decrease the intensity to enable a suitable photon detection rate at the detector, after the sample. The attenuator may be placed on the optical fiber. The light from the fiber may be collimated using a fiber collimator and then sent through a similar diffuser as used for the GASMAS measurement.

The light that has passed through the sample is collected using a PMT type photon counting detector unit. The signal from the detector unit, along with a sync signal from the laser driver, may be collected by a time correlated single photon counting (TCSPC) card which is installed in the MCU. The TCSPC card is recording a photon time histogram that can be read by the MCU.

A translation stage is moving the sample between load/unload position, GASMAS measurement and TOFS measurement. The linear stage is controlled by a stage controller (stepper motor controller), which in turn is controlled from the MCU.

Figure 5:
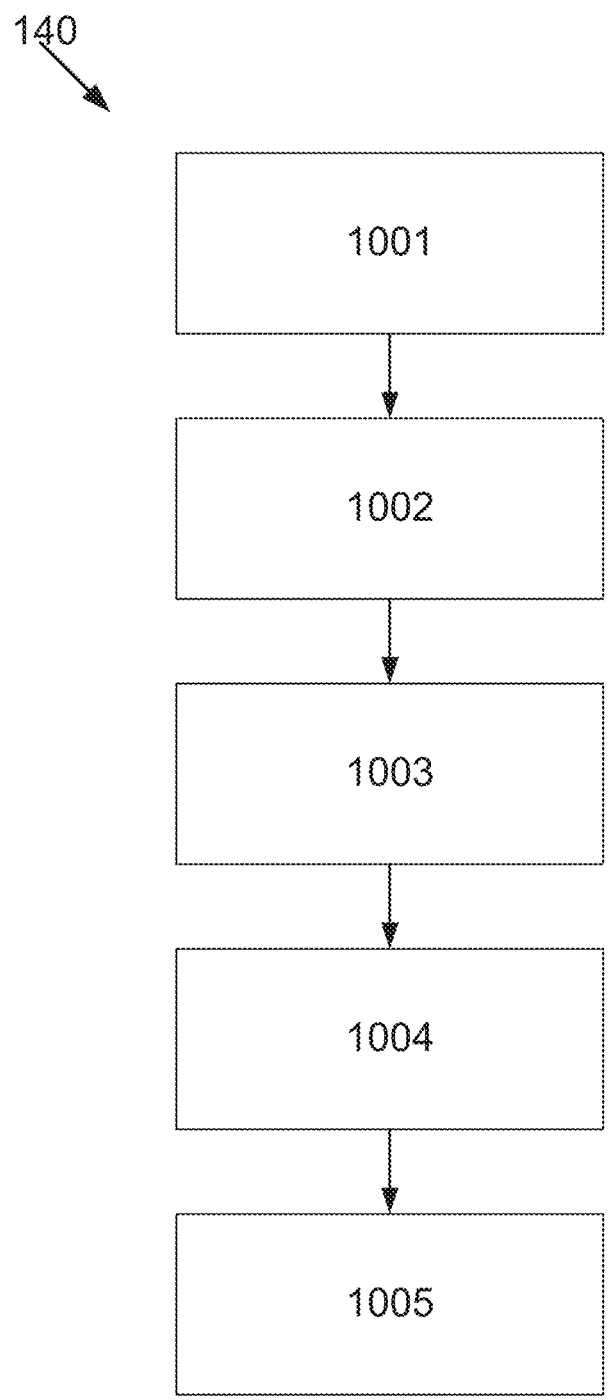
FIG. 5 is illustrating a schematic flow-chart of the method described herein.

FIG. 5 is illustrating a schematic overview over a method of providing at least one property of a porous medium 140. The method includes performing 1001 a first measurement on a sample of the porous medium obtaining an optical path through pores of the porous medium using a first sensor applying utilizing a first optical technology.

The method may also include performing 1002 a second measurement on the sample of the porous medium obtaining a total optical path through the porous medium using a second sensor utilizing a second optical technology different from the first optical technology.

The method may further include calculating 1003 an optical porosity of the porous medium based on the optical path through the pores and the total optical path through the porous medium.

The method may also include obtaining 1004 at least one property comprising of physical porosity, solid fraction or relative density of the porous medium based on the optical porosity and a calibration or a theoretic model.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

The invention claimed is:

1. A method of determining at least one property of a porous medium, the method comprising:
   performing a first measurement on a sample of the porous medium to obtain an optical path through pores of the porous medium using a first optical sensor configured to utilize a first optical technology;
   performing a second measurement on the sample of the porous medium to obtain a total optical path through the porous medium using a second optical sensor configured to utilize a second optical technology different from the first optical technology; and
   calculating an optical porosity of the porous medium, based on the optical path through the pores, and the total optical path through the porous medium,
   wherein the first measurement and the second measurement are performed on the same position on the sample.

2. The method of claim 1 further comprising obtaining at least one property comprising physical porosity, solid fraction or relative density of the porous medium based on the optical porosity and a calibration or a theoretic model.

3. The method of claim 1, wherein the first optical technology comprises Tunable diode laser absorption spectroscopy technology (TDLAS).

4. The method of claim 1, wherein the second optical technology comprises Photon Time-of-Flight (PTOF).

5. The method of claim 4, comprising obtaining a total path length by obtaining an average refractive index of the sample using an iterative process.

6. The method of claim 1, wherein at least one of the first and second measurements is performed in reflective or transmission geometry.

7. The method of claim 1, wherein the first measurement and the second measurement are performed sequentially on the sample.

8. The method of claim 7, comprising automatically moving the sample between the first and second optical sensors, whereby an illumination and detection of the sample for the first and second measurements are performed in the same optical geometry.

9. The method of claim 7, wherein the first and second measurements are performed sequentially by moving and/or switching between a first detector and a second detector.

10. The method of claim 1, wherein the first and second measurements are performed in an in-line implementation.

11. The method of claim 10, further comprising calculating a time delay as a function of an in-line speed to perform the first and second measurements sequentially on the same position on the sample.

12. The method of claim 1, comprising moving the sample in at least one direction to perform measurements of the first and second measurements at more than one point on the sample, thereby obtaining a distribution of optical porosity across the sample.

13. The method of claim 1, wherein the first optical sensor and the second optical sensor share a common light source.

14. The method of claim 13, wherein a driving unit of the common light source is configured to change a frequency between the first and second measurements.

15. The method of claim 1, wherein the first optical sensor and the second optical sensor share a common detector.

16. The method of claim 1, wherein different detectors are used for the first and second optical sensors and wherein the detectors are arranged to image a light spot on the sample from different directions.

17. The method of claim 1, wherein an instrument response function is obtained for one or both of the first and second optical sensors by measuring a reference sample while the other of the first and second optical sensors is performing a measurement on the sample of the porous medium.

18. The method of claim 17, wherein the transmittance or reflectance of the reference sample or an attenuator is automatically adjusted to obtain the same intensity on a detector of the first and/or second optical sensor for the sample and reference measurement.

19. The method of claim 1, wherein optical noise is reduced by dithering a laser beam of the first or the second optical sensor, arranging a diffusor before the sample, utilizing a moving diffusor, utilizing a laser speckle reduction and/or moving the sample during the measurement.

20. The method of claim 1, wherein the second optical technology comprises a spatial resolved technology using at least a portion of light exiting the sample.

21. The method of claim 20, wherein a spatial distribution of light exiting the sample is related to the total optical path through the porous medium by calibration or theory.

22. The method of claim 1, wherein the second optical technology is a based on the frequency domain variety of time-of-flight.

23. The method of claim 22, wherein the total optical path through the porous medium is obtained from a shape of features in a modulated signal detected by the second optical sensor, or from a shape and position of absorption lines in a signal detected by the second optical sensor.

24. A method of determining at least one property of a porous medium, the method comprising:
    performing a first measurement on a sample of the porous medium to obtain an optical path through pores of the porous medium using a first optical sensor configured to utilize a first optical technology;
    performing a second measurement on the sample of the porous medium to obtain a total optical path through the porous medium using a second optical sensor configured to utilize a second optical technology different from the first optical technology; and
    calculating an optical porosity of the porous medium, based on the optical path through the pores, and the total optical path through the porous medium,
    wherein the first and second measurements are performed in an in-line implementation.

25. A method of determining at least one property of a porous medium, the method comprising:
    performing a first measurement on a sample of the porous medium to obtain an optical path through pores of the porous medium using a first optical sensor configured to utilize a first optical technology;
    automatically moving the sample between the first optical sensor and a second optical sensor configured to utilize a second optical technology different from the first optical technology, wherein an illumination and detection of the sample for the first and second measurements are performed in the same optical geometry;
    performing a second measurement on the sample of the porous medium to obtain a total optical path through the porous medium using the second optical sensor, wherein the first measurement and the second measurement are performed sequentially on the sample; and
    calculating an optical porosity of the porous medium, based on the optical path through the pores, and the total optical path through the porous medium.

* * * * *